United States Patent Office 3,769,194
Patented Oct. 30, 1973

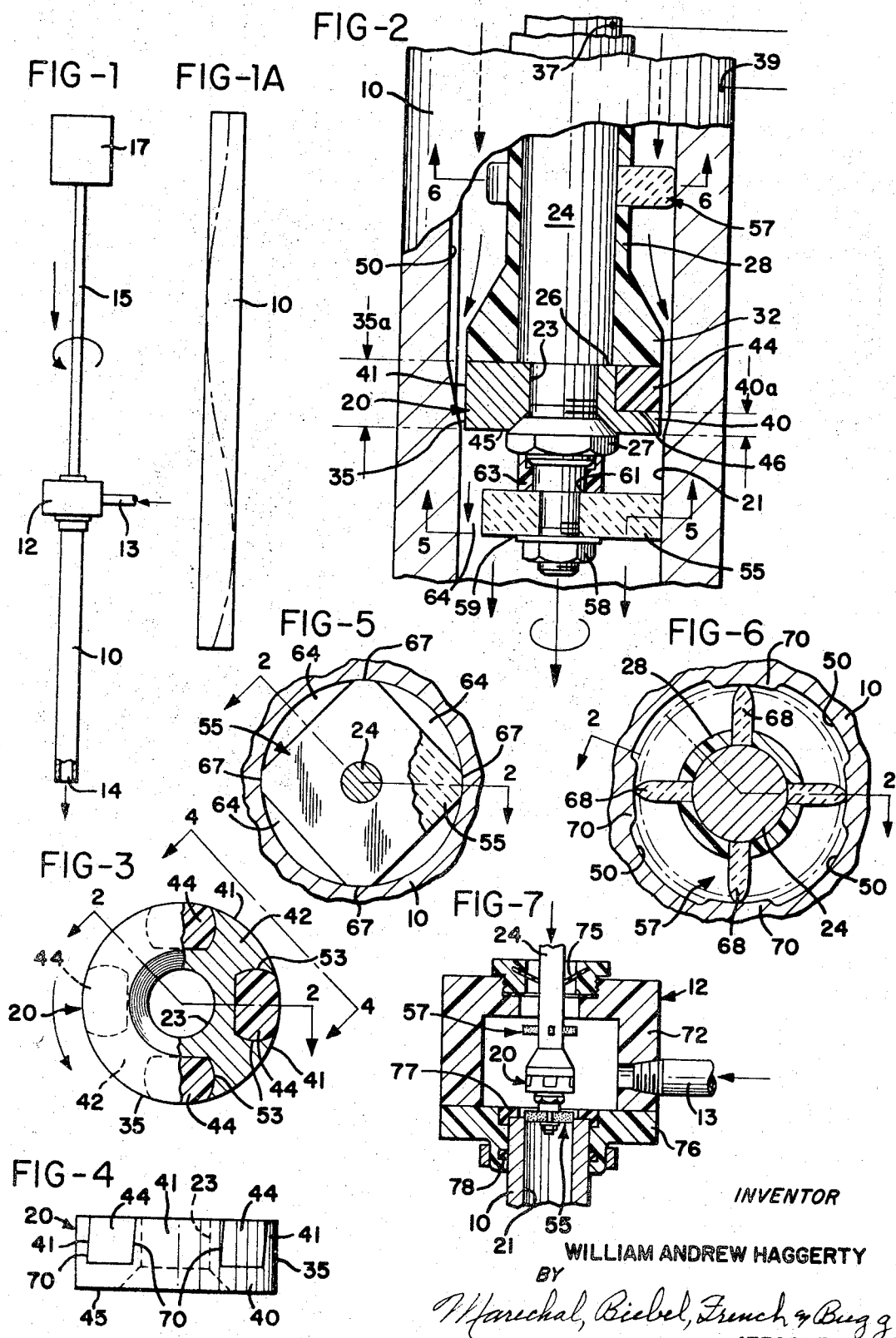

3,769,194
APPARATUS AND METHOD FOR FORMING GROOVES AND LANDS
William Andrew Haggerty, Cincinnati, Ohio, assignor to Cincinnati Milacron Inc., Cincinnati, Ohio
Original application Aug. 18, 1969, Ser. No. 850,805, now Patent No. 3,630,878, dated Dec. 28, 1971. Divided and this application Mar. 3, 1971, Ser. No. 120,601
Int. Cl. B23p *1/12, 1/20*
U.S. Cl. 204—224          3 Claims

ABSTRACT OF THE DISCLOSURE

An electrochemical machining apparatus for forming relatively shallow lands and grooves on the relatively smooth interior surface bore of a tubular member, e.g., forming rifling in a gun barrel, includes a tool advanceable into the tubular workpiece while electrolyte is pumped between the tool and the interior surface of the workpiece. The outer peripheral surface of the tool includes a bore sizing and finish machining surface and an associated segmented groove machining and groove finishing surface which is integral therewith. The bore finishing surface machines the interior surface of the bore to a predetermined dimension and is followed in the direction of tool travel by the segmented groove machining surface which forms grooves in the bore to a predetermined diameter greater than the predetermined bore dimension and separated by lands having a diameter equal to the predetermined bore dimension. By rotating the tool during its advancement spiral lands and grooves may be formed. The tool is supported by guides during its travel through the bore of the workpiece, the electrolyte flowing in the same direction that the tool is advancing.

---

This invention relates to apparatus and method for electrochemical machining, and more particularly to an improved apparatus and method for forming grooves on the interior surface of a relatively smooth bore, for example, forming rifling in a gun barrel.

This is a division of Ser. No. 850,805 filed Aug. 18, 1969, now U.S. Pat. 3,630,878.

BACKGROUND OF THE INVENTION

It is known to rifle gun barrels electrolytically by masking a portion of the interior of the bore, and electrolytically etching the unmasked portion of the interior of the bore to form rifling. Such a method, described in U.S. Pat. No. 2,848,401, for example, suffers from the disadvantage of being time consuming because of the multiple operations involved.

It is also known to form rifling in gun barrels by a combination of operations such as gun drilling the bore, electrochemically machining the bore to dimension, cold forming on a swaging machine to size and to put the rifling in the bore; or gun-drilling followed by the use of a carbide button die to finish the bore and to rifle the barrel; the rifling may also be put in the bore by a swaging operation. These operations, although generally satisfactory involve multiple steps and are time consuming. In the case of small bore rifle barrels, it is difficult to form rifling by the above mechanical methods, see U.S. Pat. No. 2,848,401, previously discussed.

SUMMARY OF THE INVENTION

By the present invention an ECM apparatus, tooling and method are provided for accurately forming the presized bore of a tubular member to a predetermined final dimension and for forming therein relatively shallow grooves of a predetermined depth and spacing, both the bore finishing operation and the groove forming operation being accomplished by one pass of the tool through the bore. The apparatus includes a manifold assembly for introducing electrolyte into the tubular member, for example, a gun barrel, and means to advance the tool into and axially along the barrel while rotating it relative to the barrel to form helical or spiral grooves in the barrel. The direction of electrolyte flow through the barrel is the same as the direction of advancement of the tool, the latter having an outer peripheral surface including a bore sizing and finishing surface which forms the bore to a final predetermined dimension and is followed by a segmented groove forming portion of the tool which forms grooves to a predetermined depth. The outer peripheral surface of the tool in its travel is positioned parallel to the direction of feed, and both the bore sizing and segmented portions of the tool are of essentially the same diameter. Since the gap between the tool and workpiece must be maintained full of electrolyte for good machining, the tool is one piece to the extent that the bore finishing surface and the segmented machining surface are integral.

The dimension of the tool as measured axially along the direction of advancement determines the amount of stock removed from the bore. For the tooling of the present invention, it has been found that this is an exponential relationship. One of the advantages of this invention is maintenance of a small gap between the tool and bore and relatively high velocity of electrolyte flow with comparatively high current densities which provide good surface finish as well as burr-free edges and sharp corners between the lands and grooves in the bore. Moreover, since the finish machining surface passes through the bore first, followed by the portion of the tool which machines the grooves, rather than vice versa, the difficulties presented by machining a finished surface to a precise dimension while maintaining an accurate nonuniform gap are eliminated.

The present tooling, apparatus and method operate quite well in instances where lands and grooves are to be formed in a bore with a total metal removal of about .010 inch or less, measured radially. This invention enables achievement of high current densities, e.g., 2000 to 6000 amps per square inch, a surface finish of from 8 to 3 microinches, RMS, and high feed rates, for example, 15 or more inches per minute.

The bore of the tubular member cooperates with the manifold to form an electrolyte chamber through which electrolyte flows. During the machining operation, the tooling is mounted on an advancing assembly which is sealed in the manifold assembly. To maintain the rifling tool spaced or centered with respect to the barrel, front and rear guide members are provided and cooperate with the advancing assembly to maintain the tool properly centered within the barrel bore.

BRIEF DESCRIPTION OF THE DRAWINGS

FIG. 1 is a diagrammatic simplified view of the apparatus of the present invention;

FIG. 1a is a view of a gun barrel showing, in simplified form, the rifling which is machined therein;

FIG. 2 is a view partly in section and partly in elevation of the tooling and support elements in accordance with the present invention positioned within a barrel during a machining operation;

FIG. 3 is a view of the front face of the tool, in accordance with the present invention, with a portion thereof broken away;

FIG. 4 is a side view of the tool as seen along the line 4—4 of FIG. 3;

FIG. 5 is a sectional view with the front guide taken along the line 5—5 of FIG. 2;

FIG. 6 is a sectional view of the rear guide taken along the line 6—6 of FIG. 2; and FIG. 7 is a view partly in section and partly in elevation of the manifold assembly in accordance with the invention.

DESCRIPTION OF THE PREFERRED EMBODIMENTS

Referring to the drawings, which illustrate a preferred embodiment of the present invention, FIG. 1 schematically shows a hollow tubular member 10 having a machined, pre-sized bore, for example, a drilled gun barrel, in which it is desired to form grooves and lands. Attached to one end of the barrel 10 and in sealing relation therewith is a manifold assembly 12 having an electrolyte inlet line 13 attached thereto. Electrolyte from a pump (not shown) is flowed axially through the bore, around a tool positioned in the manifold, and exits from the open end 14 of the barrel 10. The exiting electrolyte is then returned for use in the usual manner.

The tool, the details of which will be described later, is mounted on support element 15 which in turn is mounted for advancement into the bore of barrel 10. In those instances in which the grooves are to be spiraled, as in the case of rifling for gun barrels, the support element and tool are rotated as the tool is advanced into the bore of the barrel 10. Both the tool and support element 15 are rotated by a feed mechanism 17, known per se, and illustrated only schematically. By rotating the tool during advancement through the bore, a spiral or helical pattern of grooves and lands are formed as shown in FIG. 1a, it being understood that the pitch of the grooves and lands is variable in accordance with the number of turns of the tool and its rate of advancement.

Referring to FIG. 2, the tool, generally indicated at 20, is shown positioned in the bore 21 which is initially formed by suitable machining procedures to close tolerances as to size and roundness before the electrochemical machining operation. As shown in FIGS. 2–4, the tool 20 is round and of conductive material such as brass or the like, the diameter of the tool being .004″ to .006″ smaller than the diameter of the initially finished bore 21 of the barrel. The tool includes a central aperture 23 which receives the end of a conductive support rod 24, the rod including a shoulder 26 which abuts the tool, the latter held in place on the rod by a nut 27 which is screwed on the rod, as shown, to hold the tool 20 tightly against the shoulder 26. In this way, good mechanical and electrical connection is made between the rod and the tool.

The rod 24 is coated with an insulating material 28, such as epoxy or the like, which gradually increases in cross-section in the area immediately behind the tool until the outside diameter of the insulation equals the diameter of the tool in the area 32 immediately behind the tool. This taper operates to improve the electrolyte fluid flow characteristics across the outer periphery 35 of the tool which defines the working face thereof. A direct current is applied across the tool as a cathode and the barrel as an anode by electrical connection 37 to the rod 24 and connection 39 directly to the barrel. Since the rod and insulating coating thereon form the support element 15 which is advanced into the workpiece, the rod is coated with insulation over substantially the entire outer surface thereof to prevent stray currents from machining that portion of the bore to the rear of the tool 20.

The outer peripheral surface 35 of the tool 20 is parallel to the direction of feed and includes a bore sizing and finish machining surface 40 and a segmented groove machining and finishing surface 41, each of essentially of the same diameter, the latter immediately to the rear of the former and formed of conductive segments 42 with the tool separated by insulating blocks 44. The finish machining surface 40 is a relatively narrow annular band formed on the outer periphery of the tool positioned between front face 45 thereof and front face 46 of the insulating blocks 44. The axial dimension of this band may vary depending upon the amount of material to be removed from the bore 21 of the workpiece and the conditions under which the machining operation is conducted. A substantially uniform amount of metal is removed by the bore finish machining surface which operates to form the bore to its final predetermined dimension prior to forming the grooves therein.

The segmented machining surface 41 includes conductive segments 42 which are integral with the bore finish machining surface and, in a sense, constitute axial extensions of the bore finish machining surface. The portion of the bore 21 opposite the conductive segments 42 of the tool not only are intially finished to a predetermined dimension by the bore sizing and finish machining surface 40 but have additional metal removed as segments 42 pass ths forming portions of the bore to a diameter greater than that formed by the finishing surface. The portions of greater diameter are grooves 50. As shown, the number of conductive segments 42 of the tool correspond to the grooves while the insulating blocks correspond to the lands.

The circumferential dimension of the grooves 50 formed by portions 42 of the tool are directly dependent upon the circumferential dimensions of the segmented portions, while the depth of the grooves may vary depending upon the axial length of the segmented portions.

As shown in FIG. 3, the insulating portions 44 of the tool preferably include arcuate ends 53, when viewed in section, at the interface of the adjoining conductive portions 42. In this way, the insulating portions 44 are securely anchored to the tool. Such a configuration also simplifies fabrication of the tool which, because of the accuracy of the machining operation, must itself be machined to accurate dimensions. One method of fabricating the tool is to machine the cavities which are to receive the insulation, then casting the insulation in the cavities, followed by machining the outer periphery of the tool.

As illustrated in FIG. 2, the clearance or gap between the bore finish machining surface 40 and the opposed portion of the bore gradually narrows from a maximum at the rear of surface 40 to a minimum at the front end thereof. In this area of the bore, the aperture is tapered, as shown. In the case of the segmented machining surface, the gap decreases from the rear of the segmented surface to the front thereof, the minimum gap between the segmented machining surface and the bore being the same as the maximum gap between the bore finish machining surface and the opposed portion of the bore. Here too, the portion of the bore machined is tapered, and thus the entire portion of the surface of the bore opposite the conductive surface of the tool is tapered. Since the flow of electrolyte is in the same axial direction as the direction of tool travel and over the tapered insulating surface in area 32, the flow is through a progressively smaller annular area and through a progressively smaller gap, and then beyond the machining surface of the tool. Such flow conditions are important for this type tooling in order to maintain the entire machining gap full of electrolyte, flowing at a comparatively high velocity, without the need for complex fixturing and the like, sometimes referred to as "back pressure" fixturing.

To maintain the tool centered in the bore, front and rear gudes 55 and 57, respectively, are mounted on the support rod 24. As shown in FIGS. 2 and 5, the front guide is of electrically insulating material such as ceramic and the like and is secured to the front end of the rod by a nut 58 and washer 59, the front guide being located on a shoulder 61 provided on the front end of the rod. The small section of rod between the tool and the front guide is covered by an insulating sleeve 63 to prevent stray machining currents from removing metal from the bore in an uncontrolled manner. As shown in FIG. 5, the front guide is generally square-shaped to provide spaces 64 between the bore and the straight sides of the guide for exit of electrolyte which has flowed through the machining gap. The front guide 55 has rounded edges 67 which ride on the smooth bore, and it is understood that other shapes may be employed provided flow of electrolyte is not appreciably restricted.

Rear guide 57, also of electrically insulating material such as ceramic and the like, includes a plurality of fingers 68 which ride on the lands 70 located between adjacent grooves 50. By providing a large open area between the fingers 68 of the rear guide 57, flow of the electrolyte is not appreciably impeded.

Since the tool itself is of smaller diameter than the bore, the guides are proportioned such that their diameter is greater than the diameter of the tool but less than the bore diameter. As noted previously, the tool is approximately .004 to .006 inch less than the initially smooth bore, and thus the guide diameter may be .001 inch or less smaller than the bore diameter in order to provide a guiding function and substantially eliminate vibration of the tool during its passage through the bore.

In rifling of gun barrels, the rifling is normally formed in a spiral or helical pattern, the pitch of the helix varying depending upon the design of the particular barrel. For some rifle barrels, the helix angle is approximately 4° and this may be accomplished by imparting a rotary motion to the tool corresponding to one complete revolution per foot of axial travel. Accordingly, the insulating blocks 44 and the segmented machining surface are formed such that the edges 70 thereof are at a slight angle corresponding approximately to the helix angle, as shown in FIG. 4.

Since electrolyte is flowed between the tool and the bore, the bore, in effect, defines a chamber for electrolyte flow. To assure proper flow and to effect a seal between the pressure side of the electrolyte system and the tool, the manifold 12 is utilized and mounted on one end of the gun barrel 10. Referring to FIG. 7, the manifold is shown and includes a housing 72 which receives the electrolyte supply conduit 13. Threaded into one end of the manifold is a seal mounting assembly in which is clamped a disk type lip seal 75 which engages the outer surface of the support rod, the seal between the two being assisted by the pressure of the electrolyte which tends to deform the seal into engagement with the outer peripheral surface of the support rod. Located on the lower end of the manifold is a seal support assembly 76 which includes an annular resilient seal element 77 which engages the end and outer periphery of the barrel 10, and an O-ring seal assembly 78 between the sealed housing and outer surface of the gun barrel. The particular design of the manifold assembly is not an important element of the present invention and other designs may be used as will be apparent to those skilled in the art.

In typical operations utilizing the tooling and apparatus above described, a chrome molybdenum tubular element having a smooth inner bore of 0.636 inch was machined with a tool having an outer diameter of 0.631 inch. The axial dimension 40a (FIG. 2) of the bore finish machining surface was 0.100 inches, with the overall axial dimension 35a of the tool being 0.267 inch as measured from the front of surface 40 to the rear of the segmented portion 42. Thus, the axial dimension of the segmented machining surface was 0.167 inch greater than that of the finish machining surface. The tool was advanced into the bore at a feed rate of 15 inches per minute utilizing a voltage of 18.5 volts with an electrolyte flow of 2 gallons per minute, the electrolyte pump delivering electrolyte at 230 pounds per square inch. The temperature of the electrolyte was approximately 115° F. Total amperage during the operation was 820 amps corresponding to an average current density of 2600 amps per square inch. The electrolyte was sodium nitrate since this provided a better finish and caused less deposit to form on the tool. The diameter, as measured across the lands 70, was 0.6396 inch after the machining operation, and the depth of the grooves was .0024 inch.

The tooling and apparatus of the present invention may also be used to form rifling in a barrel of smaller diameter, for example, the rifle barrel used in a 22 caliber rifle. In this case, the initial smooth bore diameter varies from 0.2183 to 0.2188 inch. The diameter of the finished bore as measured across the lands is between 0.2200 to 0.2194, and the diameter of the bore as measured at the rifling or base of the grooves varies from 0.2240 to 0.2247. These barrels are generally 15 inches in length and may be finished using the tooling, apparatus and method of the present invention in one machining operation which takes approximately one minute.

As a guide for determining the axial length of the tool, or the portions thereof, a formula has been developed in accordance with the present invention, as follows:

$$G_F = \sqrt{\frac{2(V-\Delta V)L}{\rho \times K \times \text{F.R.}} - G_O^2}$$

where $G_F$ is the gap, in inches, between the rear edge of the segmented portion 42 of the tool and the finish groove, $G_O$ is the gap, in inches, between the outer surface of the bore finish machining surface 40 at the front face of the tool and the bore, L is the length, in inches, from the front of the bore finish machining surface to the rear of the segmented portion, V is the voltage, $\Delta V$ is the hydrogen over voltage, i.e., about 1.50, $\rho$ is the specific resistance of the electrolyte in ohms/inch, F.R. is the feed rate in inches per minute, and K is the amperes per minute to remove a cubic inch of metal (in the case of steel K is about 7800).

By way of example, for a gap clearance of .002 at the front end of the tool ($G_O$), and assuming:

V=20 v.
K=7800
F.R.=15 inches per minute
$\rho$=1.46 ohms/inch
L=.100 inch
$\Delta V$=1.5 volts then $G_F$=.0051 inch, at the rear edge 46 of the bore finishing surface.

Then, to find the length of the segmented portion required to form rifling grooves having a depth of .0025 inch, the formula is solved for L with $G_F$ equal to .0076 inch and with other parameters remaining the same. Thus it is found that a tool length of .245 inch is needed to produce grooves of the required depth.

Assuming a length of L=.001, then $G_F$=.00205 where the initial clearance is .002 and the total amount of metal removed is $G_F - G_O$ or .00005.

Accordingly, the relationship between the length of the machining surface of the tool and the gap $G_F$ and the amount of metal removed, assuming a clearance of .002 inch ($G_O$) and the previously noted conditions is as follows:

| L | $G_F$ | $G_F - G_O$ |
|---|---|---|
| .005 | .00225 | .00025 |
| .010 | .00248 | .00048 |
| .025 | .00307 | .00107 |
| .050 | .00385 | .00185 |
| .099 | .00505 | .00305 |
| .100 | .00507 | .00307 |
| .101 | .00509 | .00309 |

Thus, the above formula is of assistance in determining the tool dimensions for various operating parameters and is of considerable assistance in making tooling for removal of metal in accurately controlled amounts.

In operations of this type tooling, small gaps provide sharp corners between the lands and grooves with burr-free edges. It is also possible to provide V-shaped grooves by tapering the segmented machining surfaces so that the portion thereof closest the finish machining surface has a greater circumferential dimension than the trailing end thereof.

While the forms of apparatus and the method herein described constitute preferred embodiments of the invention, it is to be understood that the invention is not limited to these precise forms of apparatus and method, and that changes may be made therein without departing from the scope of the invention.

What is claimed is:

1. A tool for electrochemically machining the inner initially smooth surface bore of a conductive workpiece to form therein a predetermined pattern, comprising a body member of conductive material having a substantially cylindrical outer peripheral surface including a bore finish machining surface and a groove machining and finishing surface axially segmented of conducting and nonconducting material, said bore finish machining surface operative during advancement of said tool through said bore to form said bore to a predetermined diameter, said segmented groove machining and finishing surface being integral with said bore finish machining surface and immediately to the rear thereof with respect to the direction of advancement for machining the opposed portion of the bore to a predetermined diameter greater than said first mentioned predetermined diameter, and the axial dimension of said bore finish machining surface being smaller than the axial dimensions of said segmented groove machining and finishing surface.

2. A tool as set forth in claim 1 further including means for rotating said tool as it is advanced axially during machining for forming spiral grooves in the bore of the workpiece having a predetermined helix angle, said segmented groove machining and finishing surface including insulating blocks positioned to the rear of said bore finish machining surface for interrupting the outer peripheral surface of said tool which forms the segmented groove machining and finishing surface, and said blocks and the segmented portion of said tool being at an angle with respect to the center axis of said tool which corresponds to said helix angle.

3. A tool as set forth in claim 1 wherein said tool is of a diameter less than the diameter of the bore to be machined, the outer peripheral surface of said tool being essentially of the same diameter, said tool being carried by an insulated conductive support rod, guide means positioned on said support rod and adapted to contact the smooth bore and the finished bore for maintaining said tool centered therein during machining, said guide means including a front guide contacting the smooth bore and a rear guide contacting the lands formed by said tools, and the portion of said support rod between said tool and said rear guide including a tapered insulating coating which increases in cross-section until it equals the diameter of said tool.

References Cited
UNITED STATES PATENTS

| | | | |
|---|---|---|---|
| 2,902,584 | 9/1959 | Ullmann | 204—ECM Dig. |
| 3,243,365 | 3/1966 | Ai Rin | 204—143 M |
| 3,271,288 | 9/1966 | Crawford et al. | 204—212 |
| 3,055,812 | 9/1962 | Andersson | 204—225 |
| 3,410,980 | 11/1968 | Gugger et al. | 204—143 M |
| 3,429,798 | 2/1969 | Beck et al. | |

FREDERICK C. EDMUNDSON, Primary Examiner

U.S. Cl. X.R.

204—212, 286